United States Patent [19]

Hatchel

[11] 3,733,782
[45] May 22, 1973

[54] GAS TREATMENT APPARATUS AND METHOD

[76] Inventor: Charles Lee Hatchel, Rte. 12, Box 604M, Fort Worth, Tex. 76112

[22] Filed: May 11, 1971

[21] Appl. No.: 142,217

[52] U.S. Cl. ............................. 55/95, 55/90, 55/98, 55/217, 55/227, 55/233, 55/256, 55/318, 55/517, 261/DIG. 9
[51] Int. Cl. ............................................ B01d 47/02
[58] Field of Search.................... 55/97, 98, 220, 223, 55/224, 227–229, 233–234, 244, 255, 256, 315, 318, 476, 512, 515–518, 90, 95; 261/76, 78 A, 118, DIG. 9, DIG. 75

[56] References Cited

UNITED STATES PATENTS

| | | | |
|---|---|---|---|
| 2,332,063 | 10/1943 | Davis | 55/256 X |
| 2,721,065 | 10/1955 | Ingram | 55/244 UX |
| 3,142,548 | 7/1964 | Krantz | 55/233 X |
| 3,353,336 | 11/1967 | Caballero | 55/244 X |
| 3,664,094 | 5/1972 | Barkovitz | 55/223 |
| 537,509 | 4/1895 | Wardle et al. | 261/118 UX |
| 1,423,696 | 7/1922 | Stevens | 55/90 |

Primary Examiner—Frank W. Lutter
Assistant Examiner—Vincent Gifford
Attorney—Cecil L. Wood and Peter J. Murphy

[57] ABSTRACT

A treatment plant for polluted air or gas includes a water tank having a vertical inlet conduit communicating with the upper end of the tank. The tank is divided into upper and lower water chambers by a transverse filter assembly. In the inlet conduit, the gas is wetted from a spray nozzle and then directed through filtering elements to remove solid particles prior to being discharged into a lower chamber of the water tank. The gas is further purified in passing through the water, in the lower and upper water chambers, and through the filter submerged assembly. The gas to be treated may be received from building enclosures, or may be received from intake stacks collecting polluted air from particularly contaminated outside areas such as city streets.

7 Claims, 15 Drawing Figures

Fig. 1

INVENTOR.
Charles Lee Hatchel
BY
ATTORNEY

INVENTOR.
Charles Lee Hatchel

INVENTOR.
Charles Lee Hatchel

BY

ATTORNEY

INVENTOR.
Charles Lee Hatchel

GAS TREATMENT APPARATUS AND METHOD

BACKGROUND AND SUMMARY OF THE INVENTION

This invention relates to the treatment and purification of polluted air or other gases.

The increasing pollution of air caused from contaminants introduced into the air by increasing human and industrial activity is creating numerous health and other hazards. One of the known existing hazards is that of smog, which is largely derived from hydrocarbons and from their reaction with oxides of nitrogen in the sunlight; and its threat to health is becoming increasingly apparent.

Because of the increasing awareness of air pollution, studies are being made to determine its effects and additional hazards are being discovered as a result of these studies. There is increased concern in regard to measures which may be taken to decrease or even prevent air pollution. There is a growing belief that, particularly in large cities, it may be necessary to go so far as to place decontamination units in the streets to overcome certain of the disadvantages of increased human activity.

An object of this invention is to provide an apparatus, method, and system for treating of polluted effluent air or gases from building enclosures, and for collecting and treating polluted air from an outdoor contaminated area.

Another object of this invention is to provide an effective apparatus, method, and system for treating polluted air such as smog.

A preferred form of apparatus for accomplishing these objects includes a collection conduit with forced air means for flowing the polluted air into the treatment apparatus. The air is first wetted and passed through filtering devices to remove heavier particles from the air, then the air is passed through a body of water including a submerged filtering element to further purify the air prior to its discharge.

The novel features and the advantages of the invention, as well as additional objects thereof, will be understood more fully from the following description when read in connection with the accompanying drawings.

DESCRIPTION OF THE PREFERRED EMBODIMENTS

In the following description, reference will be made to several systems which include an air treatment plant for the treatment of atmospheric polluted air or for the treatment of air or other gases which are accumulated in enclosures such as buildings ranging from large industrial factories to small residences.

FIGS. 1 through 11 of the drawing are concerned with an overall system for the circulation and treatment of atmospheric air; and the remaining FIGS. 12 through 15 are concerned with systems associated with buildings or other enclosures to treat the air discharged from such enclosures.

Figure 1:
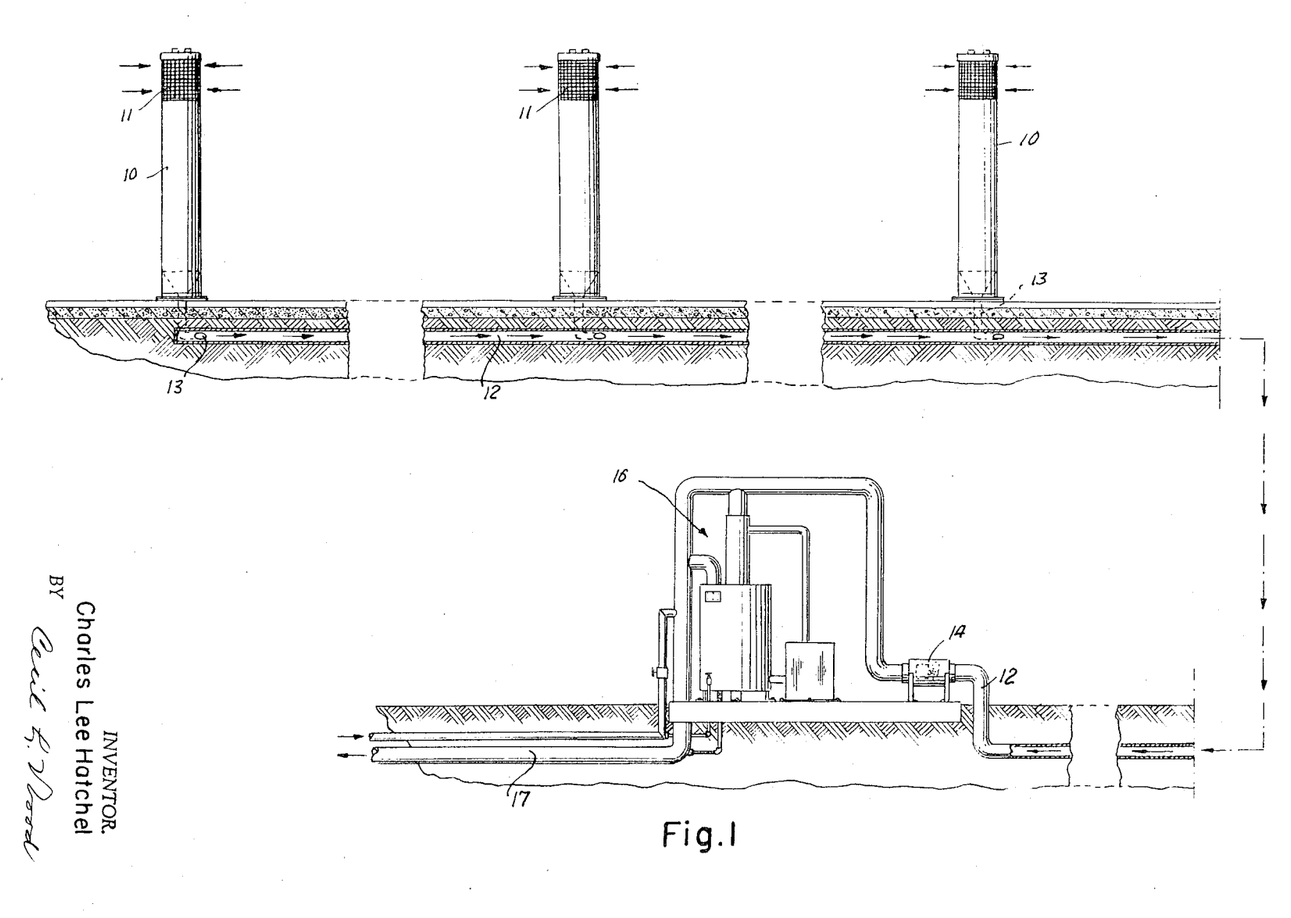
FIG. 1 is a diagrammatic view of a system for collecting polluted air from the atmosphere and processing the air in a treatment plant.

Referring particularly to FIG. 1, a system for the treatment of atmospheric air includes inlet towers 10 which would be placed in strategic locations, along city streets for example, in accordance with the volume of air required to be treated. The towers are provided with inlet openings at the top including suitable screens 11 for preventing the ingress of birds and blowing debris for example. The towers are mounted on suitable supports and communicate, at the bottoms thereof, with an underground tunnel or conduit 12 for conducting the treated air to the treatment plant 16. Where a number of inlet towers 10 are communicated with a common main conduit 12, these will be connected to the main conduit through suitable lateral conduits 13.

Each of the towers may be provided with an individual blower, as will be described, for drawing air into the tower inlet and for forcing the air through the main conduits to the treatment plant. An additional large blower 14 may be provided in the main conduit 12 at the inlet side of the treatment plant 16, to provide forced flow of the air through the treatment plant, for treatment as will be described.

The treated air may be returned to the atmosphere at the treatment plant through a suitable discharge stack, or it may be desirable or necessary that the treated air be discharged to a discharge conduit system 17, which possibly may be also underground, for discharge to the atmosphere at a location remote from the treatment plant.

Figures 2, 3, 4, 5, 6, 7, 8, 9:
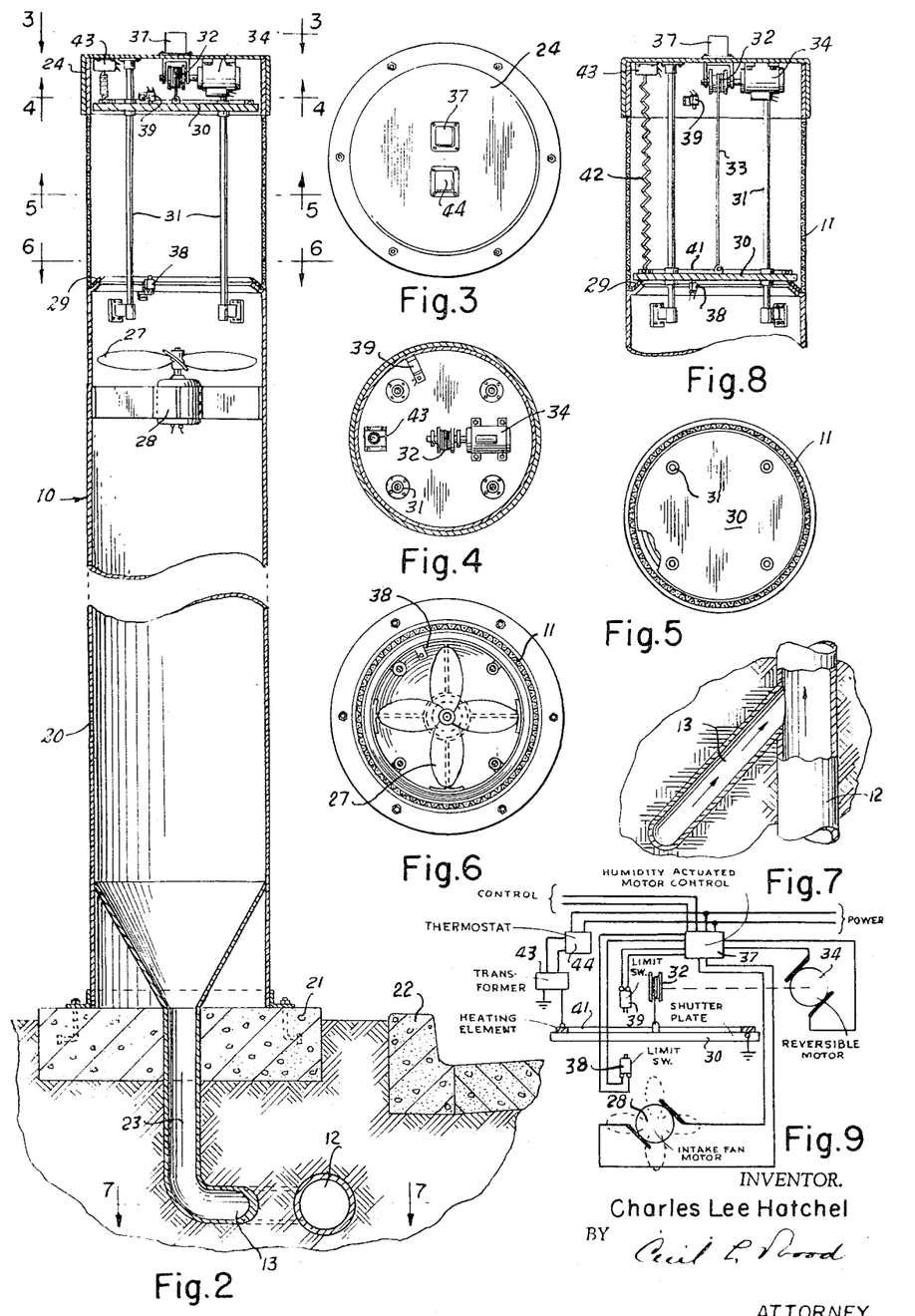
FIG. 2 is a diagrammatic sectional view through a tower, as shown in FIG. 1, for collecting air from the atmosphere.
FIGS. 3 through 6 are sectional views taken in the indicated planes in FIG. 2 illustrating details of the operating components at the top of the tower.
FIG. 7 is a sectional view taken in the plane 7—7 of FIG. 2 illustrating the underground collection conduits.
FIG. 8 is a sectional view in a vertical plane illustrating a different operative condition of components at the top of the tower as seen in FIG. 2.
FIG. 9 is a schematic circuit diagram for controlling apparatus components in the tower.

FIG. 2 and 8 illustrate, in vertical section, an inlet tower 10 as seen in FIG. 1. Referring to the drawings, the tower preferably comprises a hollow structure including cylindrical walls 20, fabricated of metal or any other suitable material, and being mounted on a suitable concrete base 21. As seen in FIG. 2, the tower may be positioned adjacent a city street indicated by the concrete curb structure 22. At the base of the tower a conduit 23 carries the inlet air through the concrete base to communicate with the lateral conduit 13.

At the upper end of the tower, the inlet screen 11 preferably defines an upward extension of the cylindrical tower wall to provide an inlet opening around the entire periphery of the tower. A cap 24 is supported above the inlet screen 11 encloses the top of the tower.

The tower is provided with a blower, shown in the form of a fan 27 driven by an electric motor 28, positioned immediately below the tower inlet opening defined by the screen 11. In the illustrated form, the fan blades have a span substantially corresponding to the inner diameter of the tower structure for withdrawing air through the inlet opening and forcing the air downward through the tower structure to the main conduit 12. Obviously, other forms of forced air blowers may be provided.

To prevent the drawing into the tower of moisture in the form of rain or snow, and to protect the blower from these elements, means are provided for closing the tower inlet in the event of such inclement weather and for stopping operation of the blower. As best seen in FIGS. 2 and 8, an inwardly directed peripheral flange is provided on the tower wall 20 adjacent to the base of the screen 11; and this flange defines a seat for a closure plate 30 which is seen as a disc-like member as viewed from the bottom in FIG. 5. The closure plate is normally stored within the tower cap 24, and is guided for vertical movement between its stored position, illustrated in FIG. 2 to its closed position, illustrated in FIG. 8, on four vertical guide rods 31 suitably anchored to the tower structure. The plate 30 is supported and moved vertically by means of a hoist drum 32 and associated cable 33, the hoist drum being driven by a suitable electric motor 34.

An automatic control system is provided for controlling the operation of the closure plate 30, and the associated operation of the fan motor 28, which is responsive to atmospheric humidity conditions or moisture. As best seen in the schematic circuit diagram of FIG. 9, and additionally in FIGS. 2 and 8, the control system includes a motor control 37 contained in a suitable housing mounted on the top of the tower cap 24, for controlling the operation of the closing plate motor 34 and the blower motor 28. The blower motor 28 will normally be energized through other controls when the system is in operation.

The motor control 37 includes a control device which is responsive to either a measurement of atmospheric humidity or a measurement of accumulated moisture resulting from precipitation. When the control device detects precipitation, the control 37 is actuated to shut off the fan motor 28 and to energize the hoist motor 34 to drive the hoist drum 32 to lower the closure plate 30 on the guide rods 31. When the closure plate becomes seated on the flange seat 29, a limit switch 38 appropriately mounted on the tower structure to be engaged by the closure plate 30, actuates the motor control 37 to shut off the hoist motor 34. The tower inlet is then closed to prevent ingress of precipitation such as rain, snow or sleet.

Apart from the purpose of closing the tower structure to prevent damage to tower components, and to prevent accumulation of moisture within the conduits 12 and 13, the necessity for purification of the atmospheric air may be diminished during periods of precipitation, since the precipitation will have a self-cleaning effect of the atmospheric air.

The motor control 37 also responds to the cessation of precipitation through humidity or moisture accumulation control, to again open the tower inlet and restart the blower 27. For this function, the motor control 37 will respond by starting the hoist motor 34 to raise the closure plate 30 to the stored condition of FIG. 2. When the plate reaches the stored position, a second limit switch 39 is engaged and actuated by the closure plate, actuating the motor control 37 to shut off the hoist motor 34 and to simultaneously start the blower motor 28. In this manner, each inlet tower 10 is controlled to automatically respond to precipitation conditions.

An additional safety control is provided to assure operation of the tower controls in the event of freezing weather. For this purpose, the closure plate 30 is provided with a heating element 41 which may be in the form of an annular electric resistance coil mounted on the top of the closure plate. The heating element is connected to a suitable power source through an expansible cable 42, connected between the closure plate and a transformer 43 mounted within the tower cap 24. A thermostatically controlled power controller 44, mounted on the top of the cap 24, controls the switching of electrical power to the heating element in response to the ambient temperature. Preferably, when the temperature decreases to a point approaching freezing, the heating element 41 is energized to prevent the formation of ice on the closure plate until such time as the ambient temperature rises above the danger point.

Figures 10, 11:
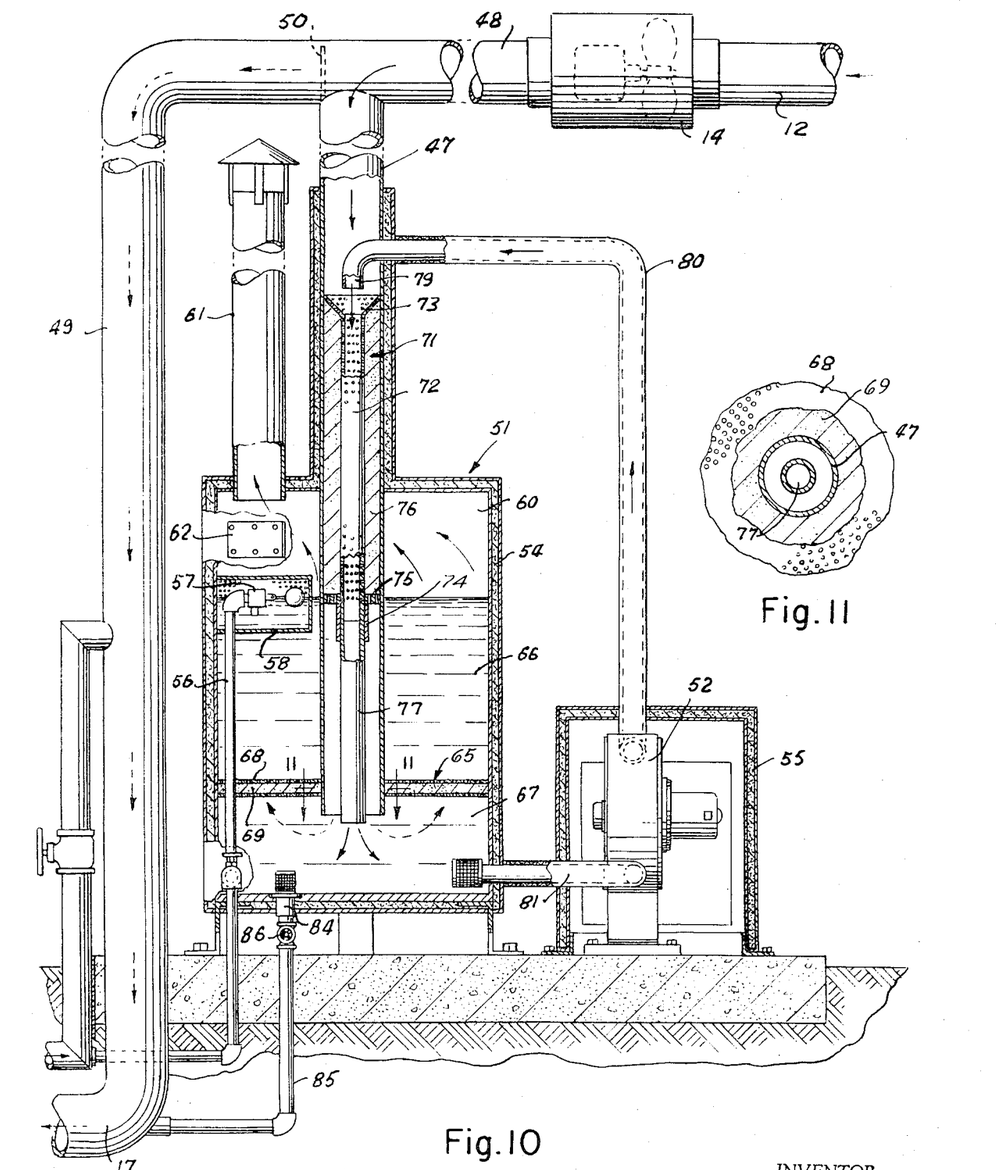
FIG. 10 is a diagrammatic view of the air treatment plant illustrated in FIG. 10.
FIG. 11 is a fragmentary detail view taken along the line 11—11 of FIG. 10.

Referring to FIG. 10, which illustrates diagrammatically a preferred form of treatment plant 16 according to the invention, the air is directed from the blower 14 to the inlet conduit 47 of the treatment plant through an inlet section 48 of the main conduit 12 which extends between the blower 14 and the plant inlet conduit 47.

The main conduit 12 includes a bypass section 49 which extends from the plant inlet conduit 47 and includes a vertical portion which connects at its lower end with the discharge conduit 17. A hinged diversion plate 50 normally directs the gas from the inlet section 48 into the plant inlet conduit 47, and alternatively into the bypass conduit 49.

The treatment plant 16 includes a closed water tank or vessel 51 and a water pump 52 for circulating water through the tank, both mounted on a suitable concrete slab 53. Since the tank and pump may be normally mounted outside of a building enclosure, the tank and pump are provided with respective insulating enclosures 54 and 55 to insulate these units from the elements, with the tank insulating enclosure 54 extending upward to include a portion of the inlet conduit 47 to which water is supplied as will be described.

In the preferred form illustrated in FIG. 10, the inlet conduit 47 extends vertically upward from the upper wall of the tank 51 for connection with an elevated inlet section 48 of the conduit 12; and the inlet conduit extends downward within the tank as will now be described. The tank is supplied with water from a water supply pipe 56; and the water in the tank is maintained at a predetermined level through a float valve assembly 57, positioned within an inner screening enclosure 58 to prevent a debris from interfering with the float valve operation. The maintained water level in the tank defines a tank gas chamber 60 above the water level in the tank, communicating with a discharge stack 61 mounted on an extending vertically upward from the tank top wall to discharge air back to the atmosphere. An access door 62 is provided in the tank wall for servicing the float valve assembly 57 when this becomes necessary.

A filter unit 65 is an annular disc-like assembly defining a horizontal partition spaced from the bottom of the tank to define separate upper and lower water chambers 66 and 67 respectively within the tank area below the water level defined by the float valve assembly 57. The tank inlet conduit 47 extends downward within the tank to a point below the filter unit 65; and the filter unit is annular in configuration extending between and being connected to the cylindrical tank walls and the exterior walls of the inlet conduit.

The filter unit 65 is fabricated of upper and lower perforated plates 68 of metal or other suitable rigid material, which enclose a body of suitable filter material 69 such as a fibrous, shredded or granular material.

An inlet filter assembly 71 is mounted within the inlet conduit 47 and includes a central perforated pipe 72 having an upper conical perforated flange 73 which has a peripheral diameter corresponding to the inner diameter of the conduit 47. A coupling 74, secured to the bottom of the perforated pipe 72, supports an annular perforated plate 75 extending between the pipe and the inlet conduit walls. An annular elongated filter body 76 fills the annular space defined between the perforated pipe and the conduit walls between the upper flange 73 and the perforated plate 75; this filter body being formed of a suitable filter material such as spun glass, shredded metal, or granular material. A solid pipe 77 is attached at its upper end to the coupling 74 to define a downward extension of the perforated pipe 72 which terminates in the lower water chamber 67 of the tank, preferably extending below the lower end of the inlet conduit 47.

A water spray nozzle 79 is disposed in the inlet conduit 47 above the inlet filter 71. Water is supplied to the spray nozzle 79 from the pump 52 through a supply pipe 80; and the suction pipe 81 for the pump 52 extends through the tank wall into the lower water chamber 67 of the tank, the inlet end of the suction pipe being enclosed with a suitable screen. The pump supply and suction pipes 80 and 81 may be covered with a suitable insulating layer to protect against freeze-up of these water pipes.

It will now be seen that the air or gas entering the treatment plant 16 flows first through the inlet filter assembly 71, then passes into the lower water chamber 67, upward through the filter unit 65, through the upper water chambers 66, then into the gas chamber 60 to be discharged through the stack 61. During operation of the unit, the pump 52 is operated to continuously discharge a spray of water from the spray nozzle 79. The incoming gas is first contacted by the water spray which wets the larger solid particles within the air or gas and these are flushed down the central perforated pipe 72 and the solid pipe 77 to the lower water chamber 67. While the water circulates within the tank, the heavier particles will settle to the bottom of the tank to be collected as sediment.

The perforated pipe 72 may be dimensioned so that its volume is substantially filled by the water flowing downward from the spray nozzle 79; and the gas will pass through the perforated conical flange 73 and through the filter body 76 where smaller solid particles and other impurities may be filtered from the gas. Some of the gas carried with the spray water may pass into the filter body through the perforated pipe 72. At the lower end of the inlet filter assembly 71 the gas within the filter body passes through the perforated plate 75 and is then discharged downward in the annular space between the solid pipe 77 and the inlet conduit 47 to be discharged into the liquid within the lower chamber 67. In passing through the water in the water chambers 67 and 66, and through the filter unit 65 the gas is further filtered, and water soluble components removed before emerging to the gas chamber 60 for discharge through the stack 61.

A screened sump 84 is connected with a discharge pipe 85 through a suitable service valve 86 for periodic flushing of the bottom of the tank to remove collected sediment from the tank, or for draining the tank for servicing and changing of filters as required for normal maintenance.

Figures 12, 13:
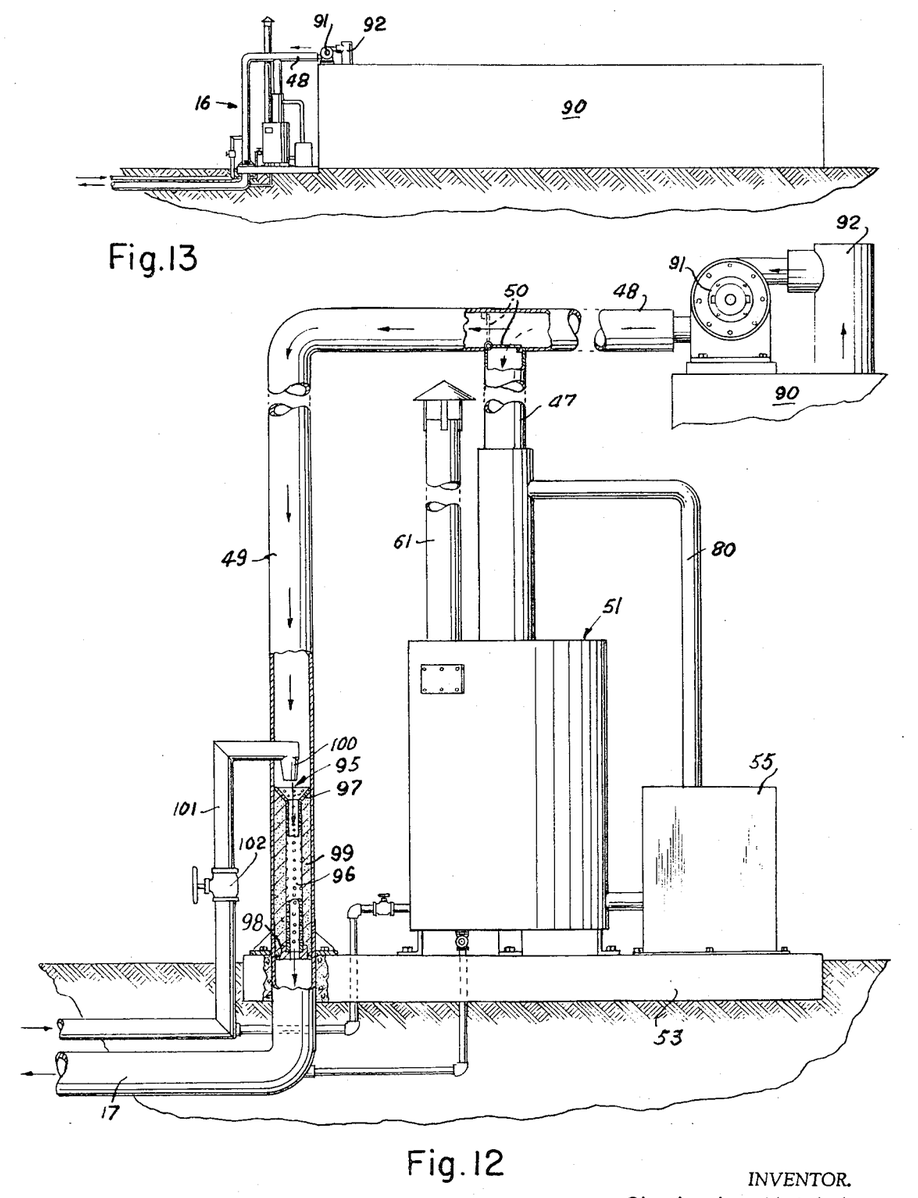
FIG. 12 is a diagrammatic view of an air treatment plant associated with a building structure or enclosure, of intermediate size, such as a restaurant, retail store, small business or other operation.
FIG. 13 is a diagrammatic view of an air treatment plant similar to that of FIG. 10, with the addition of a bypass filter.

FIG. 12 is a diagrammatic view of a system including a treatment plant 16 as above described for treating the air exhausted from a structure of intermediate size such as a retail store or restaurant 90 for example. FIG. 13 is an enlarged diagrammatic view of the treatment plant and associated conduits and components. As best seen in FIG. 13, a blower 91 is mounted on the roof of the building structure 90 and has its inlet connected to an exhaust manifold 92 of the building ventilation system, for example. The blower outlet drives the exhaust air through the inlet section 48 of the main conduit to either the inlet conduit 47 of the treatment plant or the bypass conduit 49. The treatment plant 16 as illustrated in FIGS. 12 and 13 is identical in structure and operation to that described in connection with FIG. 10.

An additional feature of the system illustrated in FIG. 13 is the provision of a filter assembly in the bypass conduit 49 which serves the function of providing some filtering of the air or gas should it be necessary to bypass the treatment tank 51 and discharge the gas into an exhaust conduit system 17 such as an existing sewer system.

The filter assembly 95 is similar in structure to the inlet filter 71, as particularly illustrated in FIG. 10, and includes an elongated central perforated pipe 96 having a funnel shaped perforated flange 97 at its upper end having an upper peripheral dimension corresponding to the inner diameter of the bypass conduit 49. An annular perforated plate 98, secured to the lower end of the pipe 96, fills the space between the pipe and the conduit walls; and the pipe, flange and plate define an elongated annular space which is filled with a suitable filtering material 99. A spray nozzle 100 is disposed in the bypass conduit above the filter assembly 95; and is supplied from a water supply pipe 101 through a service valve 102. When this filter system is employed, the water is turned on to provide a spray which wets and collects the heavier solid particles within the air or gas, which are carried through the perforated pipe with the water and are flushed into the sewer system defined by the discharge conduit 17. As in the filter assembly 71, since the perforated pipe is substantially filled with flowing water, most of the gas passes through the filter body 99 to filter out smaller particles carried within the air or gas.

Figure 14:
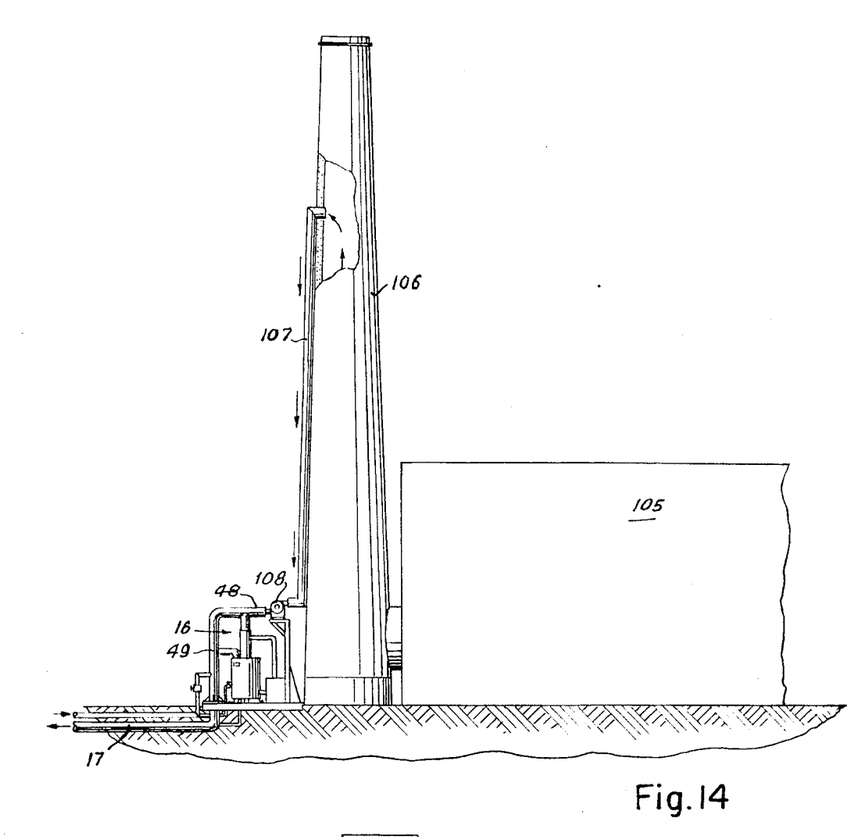
FIG. 14 is a diagrammatic view of an air treatment plant associated with a larger facility such as a factory, which includes a conventional tall stack for draft purposes.

FIG. 14 illustrates another application of a treatment system, wherein the treatment plant 16 is associated with a relatively large installation such as an industrial factory building or building complex 105, wherein there is provided a conventional tall stack 106 to provide draft and to possibly be used in a normal manner under conditions when the exhaust air or gases being passed from the building complex are not so polluted as to require treatment. When the exhaust air or gas passed to the stack 106 does require treatment, the exhaust gas is diverted to a main conduit 107 which opens to the stack at an intermediate height. A blower 108 draws the air from the main conduit 107 directing it to the inlet section 48 and into the inlet conduit 47, or alternatively through the bypass conduit 49. A diversion baffle may be provided in the stack above the main conduit 107 to assist in diverting the gas to the treatment plant 16. The treatment plant 16 has the same configuration as that previously described, and the bypass conduit may include the filter assembly 95 as illustrated in FIG. 13.

Figure 15:
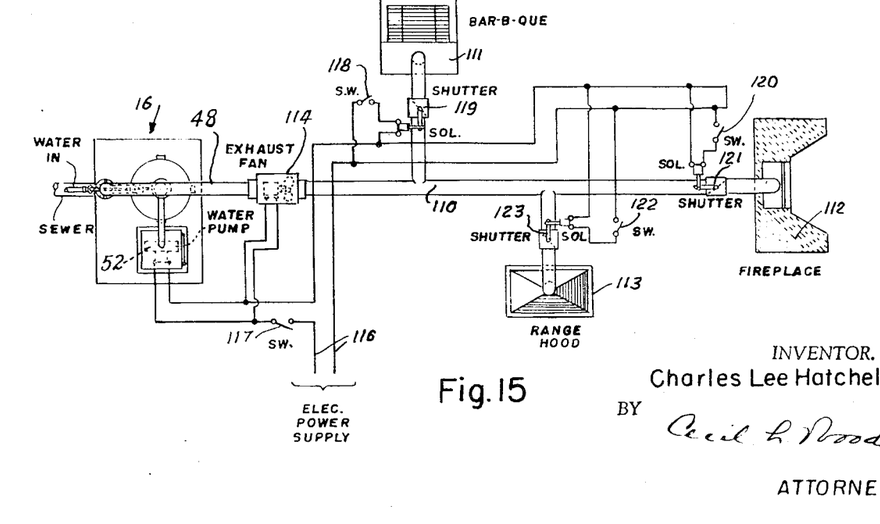
FIG. 15 is a schematic circuit diagram for operation of an air treatment system, including a treatment plant as indicated in FIG. 10, in a residence.

FIG. 15 is a diagrammatic view of a filtering installation for use in a residence, for example, including a diagrammatic illustration of electric control circuitry. In this installation, a main exhaust conduit or manifold 110 is connected to the exhaust ducts of a barbecue grill 111, a fireplace 112 and a range hood 113, to collect from each of these units the exhaust air or gases which may tend to pollute the air. An exhaust fan 114 draws the air from the main conduit 110, directing it to the inlet section 48 and to the treatment plant 16 as previously described.

The illustrated control circuit, provides means for actuating the treatment plant, which would probably be located outside of the residence structure, through control switches associated with each of the household units. As seen in the drawing, power is supplied to the electric motors for the water pump 52 and the blower 114 through electric supply conductors 116 through a main switch 117. Remote control switches 118, 120 and 122 are connected in parallel with each other and, as a group, are connected in series with the main switch 117 so that the treatment plant will be energized when the main switch 117 and any one of the remote control switches are closed.

The remote control switch 118 is associated with the barbecue grill 111; and the closing of this switch also acts through a solenoid control to open a shutter 119 in the grill exhaust duct. The remote switch 120 is associated with the fireplace 112; and the closing of this switch also acts through a solenoid control to open a shutter 121 in the fireplace exhaust duct. Similarly the remote control switch 122 is associated with a range hood 113 and the closing of this switch acts to open a shutter 123 in the range hood exhaust duct. It will be seen, then, that the closing of any one of the remote control switches 118, 120 or 122 will serve to open the exhaust duct shutter for the respective household unit and simultaneously energize the treatment plant by starting the pump and exhaust fan motors. The shutters for the units which are not to be used will remain closed so that air will not be drawn through these units. When it is desired to use two units at the same time, the closing of the control switch for the second unit will merely open the respective exhaust duct shutter to connect this unit with the treatment plant.

OPERATION OF THE PREFERRED EMBODIMENTS

The operation of the above-described systems and apparatus will now be briefly summarized.

Referring to the system and apparatus of FIGS. 1 through 11, polluted atmospheric air is collected at collection towers 10 appropriately spaced in strategic locations where polluted air such as smog may collect. Each tower includes a suction fan 27 which draws air into the tower inlet and forces the air through a conduit 12, preferably underground, to the treatment plant. The towers may include automatically controlled shutters 30, responsive to detection of humidity or precipitation, to shut off the inlet fans and close the towers against the entry of precipitation.

At the treatment plant, a blower 14 in the main inlet provides a drive for forcing the air through the treatment plant 16. The treatment plant includes an inlet filter assembly 71 and coacting water spray nozzle 79 whereby the gas is first contacted with the water spray to wet and flush the larger solid particles. These are flushed through a central perforated pipe 72 which is substantially filled with the flowing water, forcing the gas to flow through the annular filter body 76 surrounding the perforated flow pipe. The water is carried to the bottom of the treatment tank where heavier particles will settle as sediment to be removed periodically through a sump system.

The gas which passes through the inlet filter body is discharged in a lower water chamber 67 of the treatment tank then passes upwardly through the submerged filter unit 65, through an upper water chamber 66, and is discharged back to the atmosphere through a stack 61. A bypass conduit 49 and discharge conduit system 17 function to bypass the treatment plant 16 and carry the gas to a remote location in the event the treatment plant is inoperative.

In the systems of FIG. 12 through 14, a treatment plant 16 is associated with building enclosures for treating the air exhausted from such building ventilation systems, or polluted gases which may be by-products of the operations carried on in these enclosures. In these systems the same type of treatment plant 16 is used. The bypass conduit 49 may include a filter assembly 95 and associated spray nozzle 100, similar to those of the treatment plant inlet filter, to provide some filtration of the air or gas when the treatment plant is inoperative.

FIG. 15 illustrates a system for use with a residence wherein the exhaust from several household units is collected and treated, and wherein the system may be energized from any of the individual household units without effecting the units which may not be operating.

The method which is employed in the above-described apparatus and systems for the treating of polluted air or gas includes the steps of:

1. forcing the gas through a treatment plant;
2. passing the gas through an inlet passageway including an open central passage at an annular filter body;
3. contacting the gas with water spray upstream of the passageway to wet and collect a larger solid particles of the gas; spraying a volume of water sufficient to substantially fill the central passage thereby effecting the flow of the gas through the filter body;

4. discharging the gas from the passageway into a water chamber;

5. flowing the gas through water in the chamber and through a submerged mechanical filter, and discharging the cleansed gas to the atmosphere.

While preferred embodiments of the invention have been illustrated and described, it will be understood by those skilled in the art that changes and modifications may be resorted to without departing from the spirit and scope of the invention.

What is claimed is:

1. Gas treatment apparatus comprising
a water tank; a vertically disposed inlet conduit for said tank, terminating at its lower end within the liquid chamber of the tank;
a filter assembly in said inlet conduit positioned above the water level of said tank comprising a central perforated pipe and an annular mechanical filter body disposed between said pipe and the conduit walls;
water spray means for discharging into said filter assembly a volume of water sufficient to substantially fill the central perforated pipe of said filter assembly.

2. Apparatus as set forth in claim 1
including separate pipe means communicating the lower end of said filter assembly perforated pipe with the liquid chamber of said tank to discharge the spray water flowing through said perforated pipe at the bottom of said tank;
and pump means associated with said tank, including a suction line communicating with said tank adjacent to the bottom thereof, and a discharge line for supplying water to said water spray means.

3. Apparatus as set forth in claim 1
including a second filter assembly mounted in said tank to be submerged in the water in said liquid chamber; said filter assembly defining a horizontal wall separating said liquid chamber into upper and lower portions;
said inlet conduit extending through said filter assembly to the lower liquid chamber, whereby gases emerging from said conduit flow upward through the lower liquid chamber, said submerged filter assembly, and said upper liquid chamber.

4. Apparatus as set forth in claim 3
wherein said second filter assembly comprises spaced parallel perforated plates enclosing a layer of fibrous or granular filtering material.

5. Apparatus as set forth in claim 1
wherein said water tank is a closed tank; means to maintain the liquid level in said tank to define a gas chamber at the top thereof; and a gas discharge conduit communicating with the tank gas chamber.

6. A method for treating exhaust gases to remove impurities therefrom including the steps:
passing the gas through a passageway above and terminating in a body of water, said passageway defined by an annular filter body and a central perforated open passage;
contacting the gas at the upstream end of said passageway with a volume of spray water sufficient to substantially fill said central passage whereby the gas is caused to pass through the filter body;
and flowing the gas emerging from said passageway through said body of water.

7. A method as set forth in claim 6 including the step:
passing said gas through a mechanical filter unit submerged in said body of water.

* * * * *